United States Patent
Herwig

(10) Patent No.: US 10,435,095 B2
(45) Date of Patent: Oct. 8, 2019

(54) METHOD AND CONVEYING SYSTEM FOR THE SIMULTANEOUS TRANSPORT OF ELONGATED WORKPIECES AND WORKERS IN A PRODUCTION LINE

(71) Applicant: EISENMANN SE, Boeblingen (DE)

(72) Inventor: Gernot Herwig, Holzgerlingen (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 15/951,369

(22) Filed: Apr. 12, 2018

(65) Prior Publication Data
US 2018/0297655 A1    Oct. 18, 2018

(30) Foreign Application Priority Data
Apr. 13, 2017 (DE) .................. 10 2017 108 023

(51) Int. Cl.
| | | |
|---|---|---|
| B62D 65/02 | (2006.01) | |
| B65G 17/34 | (2006.01) | |
| B62D 65/18 | (2006.01) | |

(52) U.S. Cl.
CPC ......... B62D 65/026 (2013.01); B62D 65/028 (2013.01); B62D 65/18 (2013.01); B65G 17/34 (2013.01)

(58) Field of Classification Search
CPC .... B62D 65/026; B62D 65/18; B62D 65/028; B65G 17/005; B65G 17/12; B65G 17/123; B65G 17/126; B65G 17/14; B65G 17/16; B65G 17/34
See application file for complete search history.

(56) References Cited

U.S. PATENT DOCUMENTS

| | | | | |
|---|---|---|---|---|
| 5,127,336 A | * | 7/1992 | Wakabayashi | ............. B61J 1/10 104/243 |
| 5,678,974 A | * | 10/1997 | Murano | ..................... B61J 1/04 414/362 |
| 6,292,998 B1 | * | 9/2001 | Wiemers | ................... B23Q 1/38 269/8 |
| 6,374,993 B1 | * | 4/2002 | Tetzloff | .................. B61B 10/02 198/465.4 |

(Continued)

FOREIGN PATENT DOCUMENTS

| | | |
|---|---|---|
| DE | 40 20 286 | 1/1992 |
| DE | 10 2005 034 582 | 2/2007 |

(Continued)

*Primary Examiner* — Mark A Deuble
(74) *Attorney, Agent, or Firm* — Schroeder Intellectual Property Law Group, LLC

(57) ABSTRACT

A method for the transport of elongated workpieces and workers, in a production line which has a rectilinear production section. A plurality of conveyor trolleys, which respectively have an assembly platform that extends over the whole of the conveyor trolley length and is accessible for workers, move in the rectilinear production section jointly along a direction of conveyance and form a convoy in which the assembly platforms of adjacent conveyor trolleys adjoin one another in an at least substantially gap-free manner. The workpieces are arranged in such a way on the assembly platforms that a longitudinal direction of the workpieces is arranged at an angle between 25° and 65°, and preferably of about 45°, to the direction of conveyance.

12 Claims, 6 Drawing Sheets

(56) References Cited

U.S. PATENT DOCUMENTS

| | | | |
|---|---|---|---|
| 6,494,304 B1* | 12/2002 | Jaynes | B61B 10/025 |
| | | | 104/172.1 |
| 8,458,897 B2 | 6/2013 | Tohyama et al. | |
| 8,959,751 B2* | 2/2015 | Shimizu | B62D 65/06 |
| | | | 29/564.1 |
| 10,011,430 B2* | 7/2018 | Mader | B65G 17/12 |
| 2005/0212191 A1* | 9/2005 | McKelvie | B60S 13/00 |
| | | | 269/17 |
| 2008/0276827 A1 | 11/2008 | Roeckle et al. | |
| 2009/0010746 A1* | 1/2009 | Okazaki | B62D 65/18 |
| | | | 414/590 |
| 2017/0047815 A1* | 2/2017 | Wells | H02K 7/116 |
| 2017/0073167 A1* | 3/2017 | Ookada | B65G 35/066 |

FOREIGN PATENT DOCUMENTS

| | | |
|---|---|---|
| EP | 2 396 215 | 3/2014 |
| JP | 2015-217753 | 12/2015 |

* cited by examiner

(12) United States Patent

METHOD AND CONVEYING SYSTEM FOR THE SIMULTANEOUS TRANSPORT OF ELONGATED WORKPIECES AND WORKERS IN A PRODUCTION LINE

RELATED APPLICATIONS

The present application claims priority to German Application No. 10 2017 108 023.6 filed Apr. 13, 2017—the contents of which are fully incorporated herein by reference.

BACKGROUND OF THE INVENTION

1. Field of the Invention

The invention relates to a method and a conveying system for the simultaneous transport of motor vehicles or other elongated workpieces, and workers, in a production line of a production site. Conveying systems of this type are used, in particular, in the final assembly of motor vehicles or of machines which are produced in large batch quantities.

2. Description of the Prior Art

In the final assembly of workpieces, conveying systems in which the workers are transported jointly with the workpieces over a lengthy period are frequently used. In this way, the workers can perform works on the workpieces without having to walk alongside the workpieces.

The conveyor trolleys of these conveying systems have a workpiece receptacle for the fastening of the workpiece, an assembly platform which is accessible for the workers, and a running gear having wheels or runners on roll bars. Usually the conveyor trolleys form a pushed convoy while they transport the workers jointly with the workpieces. The respectively last conveyor trolley here pushes the ahead-running conveyor trolleys from the rear, said last conveyor trolley being driven by fixed external drive means. These drive means can be constituted, for instance, by friction wheels, which engage from outside on the longitudinal sides of the respectively last assembly platform and in this way apply the thrust which is necessary for the forward movement of the entire pushed convoy. The pushing from the rear ensures that the assembly platforms within the pushed convoy adjoin one another in a gap-free manner, so that the workers can cross over without danger onto adjacent assembly platforms. At the end of a production section, the pushed convoy is disbanded again. For this, the workpieces are usually removed from the conveyor trolleys. The empty conveyor trolleys are subsequently transferred vertically or horizontally in a transfer station and run back empty on another conveyor line. Instead of permanently disbanding the pushed convoy, the conveyor trolleys can also be briefly isolated and conveyed on a curved track to a further production section, where they again form a pushed convoy.

From DE 40 20 286 C2, a conveying system of this type is known. The conveyor trolleys which are described there additionally have dedicated drives. As a result, the conveyor trolleys can travel independently between the production sections. As soon as a conveyor trolley is received into the pushed convoy, the dedicated drive is switched off. A particularity with the conveyor trolleys of this known conveying system consists in the fact that the drive wheels can be turned through 90°. As a result, the conveyor trolleys can run transversely to the next production section, so as there to be received into the next pushed convoy.

A similar conveying system is known from DE 10 2005 034 582 A1. There too, the conveyor trolleys possess a dedicated drive, which is used, however, also for the conveyance in the pushed convoy. The external fixed drive means can thereby be dispensed with. The conveyor trolleys thus do not have to withstand the high longitudinal and transverse forces which, through the travel in the pushed convoy, are generated by the lateral friction wheels. The conveyor trolleys can hence be built in lighter construction.

In production lines for the assembly of motor vehicles, the rectilinear production sections, within which the conveyor trolleys move in convoy, generally have a predefined width, which measures, for example, 8 m. Within this width not only must the conveyor trolleys be accommodated, but also marginal strips which are accessible for the workers and material supply zones for the storage of the parts to be fitted and for the required tools. Owing to the limited width of the production sections, the motor vehicles to be assembled are therefore fastened in such a way on the assembly platforms that the longitudinal direction of the motor vehicles is oriented parallel to the direction of conveyance. The assembly platforms are rectangular and dimensioned such that an accessible section remains around the workpiece. Owing to the elongated shape of the motor vehicles, also the longitudinal axis of the assembly platforms consequently runs parallel to the direction of conveyance. In this way, the conveyor trolleys normally take up no more than 50% of the available width of the production section.

A drawback with the known conveying systems is however that, due to the longitudinal orientation of the motor vehicles in the direction of conveyance, the distances between two successive motor vehicles are long. Since the workers frequently, over the full length of the production section, do not remain on a specific assembly platform, but switch between these, the workers have to cover correspondingly large distances in order to be able to continue the work on a motor vehicle which, viewed in the direction of conveyance, lies further back.

The same also applies to other elongated workpieces such as trailers and other vehicles.

SUMMARY OF THE INVENTION

The object of the invention is to define a method and a conveying system for the simultaneous transport of elongated workpieces and workers in a production line of a production site, in which better use is made of the available area than previously and the distances along the production line which are to be covered by the workers are shorter than previously.

In terms of the method, this object is achieved by a method for the simultaneous transport of elongated workpieces and workers in a production line which has a rectilinear production section. A plurality of conveyor trolleys, which respectively have an assembly platform that extends over the whole of the vehicle length and is accessible for workers, move in the rectilinear production section jointly along a direction of conveyance and here form a convoy in which the assembly platforms of adjacent conveyor trolleys adjoin one another in an at least substantially gap-free manner. According to the invention, the workpieces are arranged in such a way on the assembly platforms that a longitudinal direction of the workpieces is arranged at an angle between 25° and 65°, and preferably between 40° and 50°, to the direction of conveyance.

In terms of the conveying system, the object is achieved by a conveying system for the transport of elongated workpieces and workers in a production line which has a rectilinear production section. The conveying system has a plurality of conveyor trolleys, which respectively have a workpiece receptacle and an assembly platform that extends over the whole of the vehicle length and is accessible for workers. The conveyor trolleys move in the rectilinear production section jointly along a direction of conveyance and form a convoy in which the assembly platforms of adjacent conveyor trolleys adjoin one another in an at least substantially gap-free manner. According to the invention, the workpiece receptacle is configured such that a longitudinal direction of the workpieces to be fastened thereon is arranged an angle between 25° and 65°, and preferably between 40° and 50°, to the direction of conveyance.

Due to the inventive angular position of the workpieces, the assembly platform can be built shorter in the direction of conveyance. The distances which are to be covered by the workers along the direction of conveyance, in the switching between the assembly platforms, are thereby reduced. Still shorter distances for the workers could theoretically be achieved if the longitudinal axes of the workpieces were arranged perpendicular to the direction of conveyance. However, this would call for conveyor trolleys of such width that, to the side of the conveyor trolleys, there would scarcely be space available for the storage of parts and tools. The inventive angular position therefore represents an optimal compromise between shortening of the structural length in the direction of conveyance, on the one hand, and utilization of the available area transversely to the direction of conveyance.

The workpiece receptacles, which are frequently configured as a lifting table, generally have a plurality of fixing elements for the positive fixing of the workpieces on the workpiece receptacle. The fixing elements can be constituted, for instance, by prismatic or conical recesses, in which complementarily shaped projections which are configured on the workpiece, or on an additional workpiece, carrier engage.

For the reception of elongated workpieces, normally also the workpiece receptacles are elongated and have a longitudinal direction in which their dimensions are larger than in a transverse direction running perpendicular thereto. In order that the workpiece can be oriented obliquely to the direction of conveyance, such elongated workpiece receptacles have a longitudinal direction which is likewise arranged at an angle between 25° and 65°, and preferably between 40° and 50°, to the direction of conveyance.

As a result of the inventive oblique arrangement of the workpieces on the assembly platforms, these have a greater width than previously. This results in a shape of the assembly platforms which is at least approximately square and preferably have the shape of a rectangle having a small aspect ratio V<1.2. As the aspect ratio is designated the ratio of length to width of a rectangle. The longitudinal axes of the workpieces then run preferably along a plane diagonal of the assembly platforms.

For the conveyance of passenger vehicles to be assembled, assembly platforms which have the shape of a square having a 5 m side length can, for instance, be used. Passenger vehicles oriented at an angle of 45° to the direction of conveyance can then be transported such that the workers can also reach the end faces of the passenger vehicles without difficulty. To both sides of such an assembly platform, material supply zones having a width of respectively 1.5 m, which is generally sufficient, still then remain.

As a result of the angular position of the workpieces on the assembly platforms, these are divided by the longitudinal axis of the workpieces into respectively two work areas, which are at least substantially triangular. Preferably, in each of the two work areas is arranged at least one material supply device for the storage of the individual parts to be fitted, and for the removal thereof by the worker. Ideally, the material supply device is arranged contiguous to the corner, or in the direct vicinity thereof. As a result, between the material supply device and the workpiece, sufficient space remains for the worker. In traditional conveying systems, the space between such a material supply device and the workpiece is frequently very narrow, so that the worker must move particularly carefully in this region. In the triangular work areas of the conveying system according to the invention, the worker, owing to the more favourable arrangement of the workpiece on the assembly platform, can thus move more freely and more safely than is the case in previous conveying systems.

If the longitudinal axes of the workpieces are arranged parallelly in the rectilinear conveying section parallel to one another, the large triangular work areas of the assembly platforms adjoin the smaller work areas which, in the longitudinal direction, are located in front of and behind the workpieces on the respectively adjacent assembly platforms. In this way, right across the vehicle range, still better use can be made of the assembly platforms than is the case in the previously known conveying systems.

Primarily motor vehicles, but also other workpieces, are generally conveyed by overhead conveyors or similar conveying devices, before being deposited on the assembly platforms of the conveyor trolleys. In these conveying devices, the workpieces are normally conveyed such that the longitudinal direction of the workpieces is oriented parallel to the momentary direction of conveyance. Should this direction of conveyance run precisely parallel to the direction along which the longitudinal axis of the workpieces is intended to be oriented on the assembly platforms, the workpieces can be easily deposited on the assembly platforms by the conveying device and are then already in the inventive angular position.

Owing to structural restrictions, it is in most cases, however, not possible to orient the direction of conveyance of the conveying device in this way. In these cases, the workpieces, either in the transfer from the conveying device to the conveyor trolleys or shortly prior to the entry into the rectilinear production section, must be rotated about a vertical axis. For this purpose, the conveyor trolleys can have a workpiece receptacle, which is rotatable about a vertical axis. The workpiece is then deposited on the workpiece receptacle by the conveying device and is rotated on this receptacle until the workpiece has reached the desired angular position.

In order to be able to make the conveyor trolleys as simple and light as possible, it can be more expedient, however, to rotate the workpieces already prior to placement on the workpiece receptacle. A rotating mechanism for the workpiece receptacle can then be dispensed with. In order to effect the rotation of the workpiece prior to its fastening onto the workpiece receptacle, the conveying system can have a rotating device which is designed to rotate the workpiece about a vertical axis.

BRIEF DESCRIPTION OF THE DRAWINGS

Illustrative embodiments of the invention are explained in greater detail below with reference to the drawings, in which.

DESCRIPTION OF PREFERRED ILLUSTRATIVE EMBODIMENTS

1. Prior Art

Figure 1:
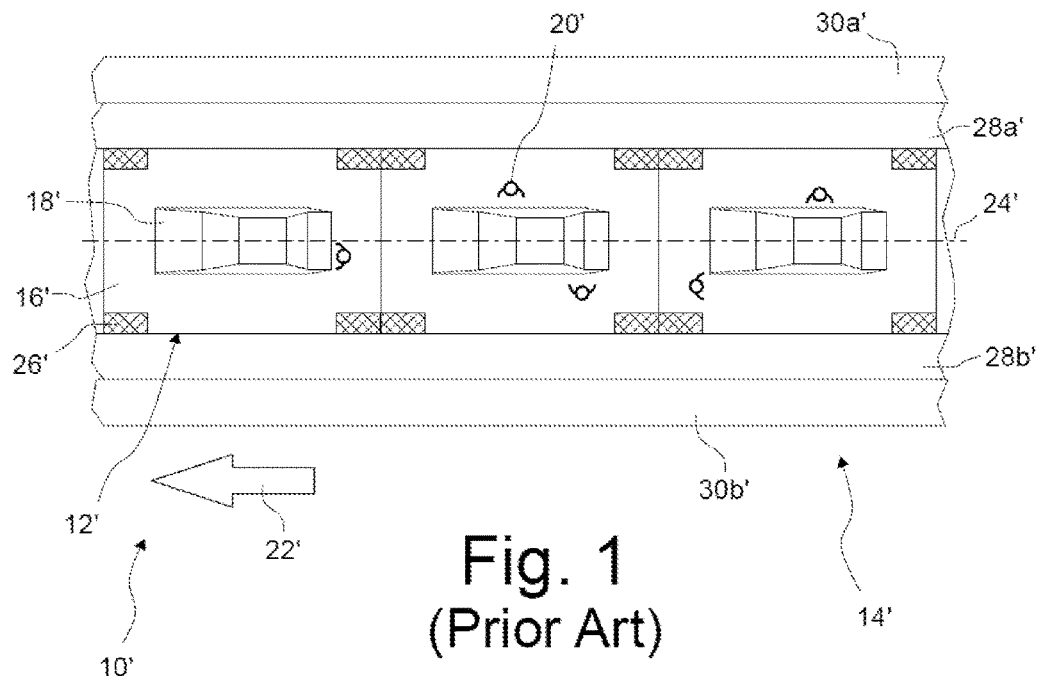
FIG. 1 shows a conveying system known from the prior art, in which a plurality of conveyor trolleys jointly form a pushed convoy.

FIG. 1 shows in a schematic top view a conveying system 10' known from the prior art, in which a plurality of conveyor trolleys 12', in a rectilinear production section 14' of a production line, jointly form a pushed convoy. In the top view can be seen the assembly platforms 16' of the conveyor trolleys 12', which are mounted on bogies (not discernible in top view). Each assembly platform 16' carries a motor vehicle 18' to be assembled and is accessible for workers 20'. The assembly platforms 16' respectively have a rectangular shape, wherein the longitudinal axes 24' of the assembly platforms 16' are aligned and run parallel to a direction of conveyance (indicated with an arrow 22'), along which the motor vehicles 18' are conveyed by the conveyor trolleys 12' during the assembly.

The assembly platforms 16' further carry material supply devices 26', which, in the represented example, are respectively mounted on the corners of the assembly platforms 16'. The material supply devices 26' can be constituted, for instance, by racks, in which parts to be fitted are stored so as to be able to be removed by the workers 20', or can be constituted by pallets, on which materials are stacked. Usually, the material supply devices 26' are configured such that they can be regularly exchanged for newly filled material supply devices 26'.

Extending to both sides of the conveyor trolleys 12' are side bands 28a', 28b', which in the represented example are stationary. The side bands 28a', 28b' can, however, also be configured as conveyor belts, which move at the same speed as the assembly platforms 16' and are located at the same height as these. The side bands 28a', 28b' then actually enlarge the width of the assembly platforms 16' which is available to the workers 20'.

To the outside, the side bands 28a', 28b' are adjoined by material supply zones 30a', 30b', in which further material supply devices, tools or intermediate stores for the parts to be fitted, and other materials, can be found, as is known per se in the prior art.

In the represented example, the width of the assembly platforms 16' is four metres, and the width of the side bands 28a', 28b' and of the material supply zones 30a', 30b' is respectively one metre.

As a result, the 8 m width which is in total available for the production line is fully utilized, wherein the assembly platforms 16', by themselves, take up half of the available width.

Figure 2:
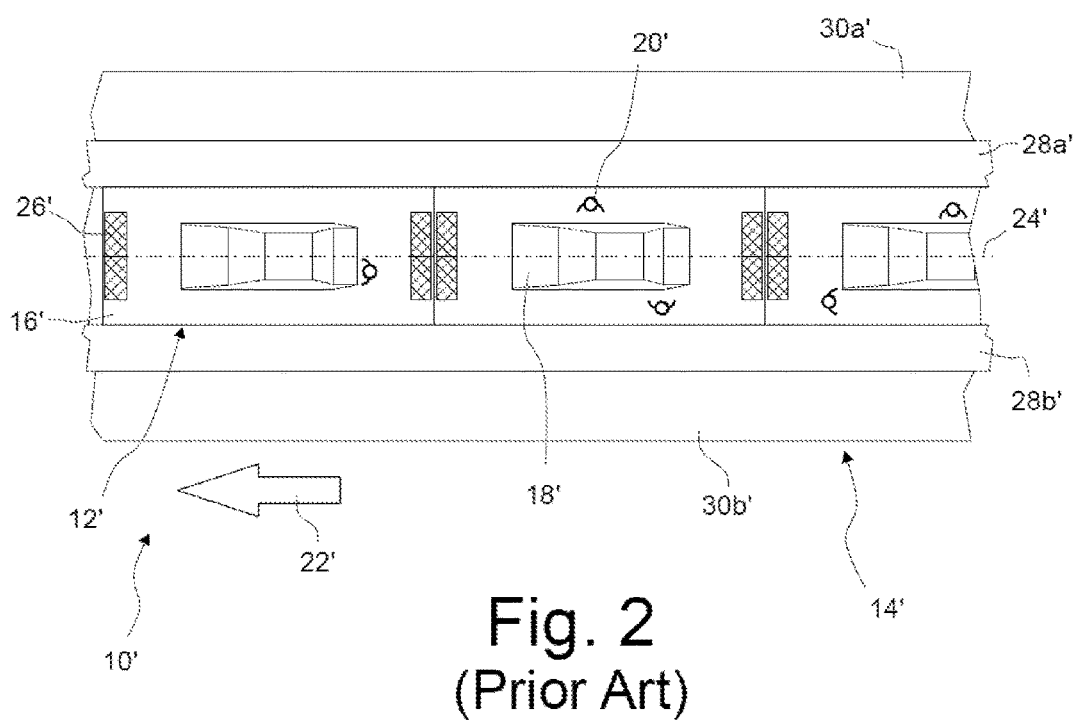
FIG. 2 shows a conveying system known from the prior art, in which the assembly platforms, in comparison to the conveying system shown in FIG. 1, are narrower.

FIG. 2 shows a similar conveying system 10', in which the aspect ratio of the rectangular assembly platforms 16' is larger. In this example, the assembly platforms have 16' a width of only 3 m, and, in return, a length of 8 m. Owing to the lesser width of the assembly platforms 16', the material supply devices 26' are arranged on the end sides of the assembly platforms 16'. The advantage with this dimensioning of the assembly platforms 16' is that the material supply zones 30a', 30b' can be wider than in the example shown in FIG. 1. As a result of the greater length of the assembly platforms 16', workers 20' must go back over longer distances, however, should they wish to switch between the motor vehicles 18'.

2. Conveying System According to the Invention

Figure 3:
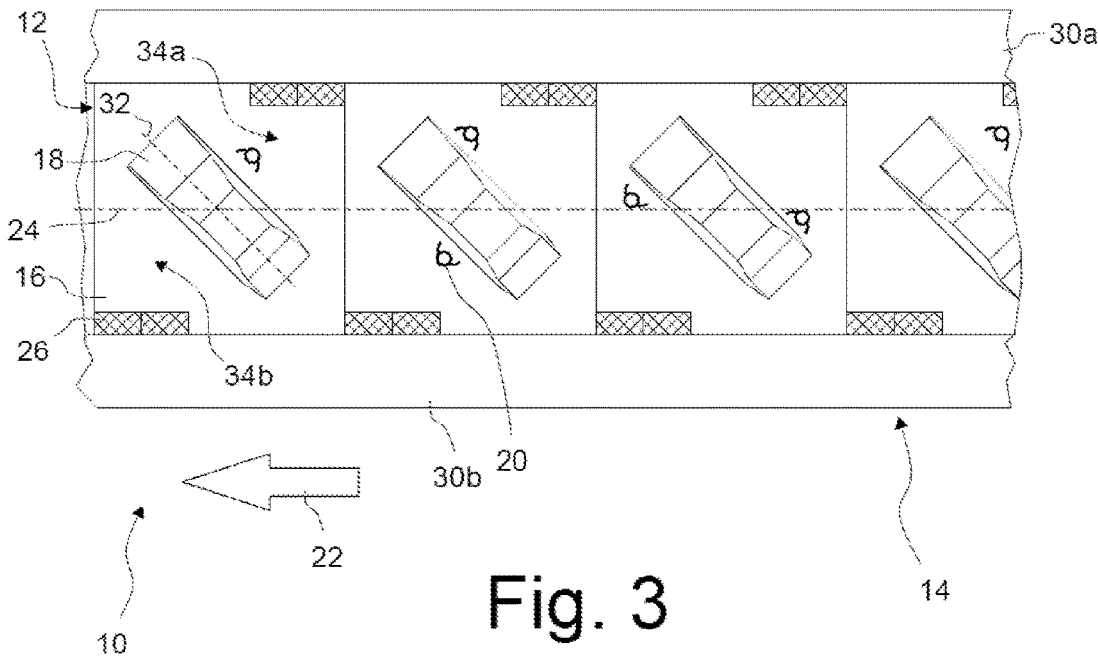
FIG. 3 shows a conveying system according to the invention, in which motor vehicles to be assembled are arranged obliquely on the assembly platforms.

FIG. 3 shows in a schematic top view a conveying system 10 according to a first illustrative embodiment of the invention. The assembly platforms 16 of the conveyor trolleys 12 have the shape of a square having a 5 m side length. The motor vehicles 18 to be assembled are arranged in such a way on the assembly platforms 16 that the longitudinal axes 32 of the motor vehicles 18 is arranged at an angle of 45° to the direction of conveyance 22, wherein the longitudinal axes 32 of all motor vehicles 18 run parallel to one another. In the represented illustrative embodiment, the respective longitudinal axis 32 thereby coincides at least approximately with a plane diagonal of the assembly platforms 16.

Due to this diagonal mounting of the motor vehicles 18, each assembly platform 16 is divided by the motor vehicle 18 into two triangular work areas 34a, 34b, in which the workers 20, despite the material supply devices 26 arranged there, can move freely and safely. In the illustrative embodiment represented in FIG. 3, the material supply devices 26 are arranged along the side edges, running in the direction of conveyance 22, of the assembly platforms 16.

In front of and behind the motor vehicles 18, there remains on each individual assembly platform 16, due to the diagonal arrangement, space for the worker 20. This space is enlarged by virtue of the fact that the sections concerned are adjoined by the triangular work areas 34a, 34b of the adjacent assembly platforms 16 and can be used for the placement of material. Right across the vehicle range, the workers 20 can hence make still better use of the assembly platforms 16 than was previously possible in conveying systems of this type.

The angular position of the motor vehicles 18 calls for a greater width of the assembly platforms 16. Since the workers, however, have a great deal of space in the triangular work areas 34a, 34b, the previously necessary side bands 28a, 28b can be dispensed with. In the represented illustrative embodiment, the assembly platforms 16 are therefore directly adjoined by the material supply zones 30a, 30b. Given a width of the production line of 8 m in total, the material supply zones 30a, 30b can thus, in the represented illustrative embodiment, still respectively be 1.5 m wide. In the material supply zones 30a, 30b there is therefore precisely as much space as in the example, shown in FIG. 2, from the prior art, which there, however, is only possible by the acceptance of very long assembly platforms 16.

In contrast thereto, the assembly platforms 16 according to the invention, in the illustrative embodiment represented in FIG. 3, are 37.5% shorter than in the example, shown in FIG. 2, from the prior art. If a worker 20 switches only between two adjacent assembly platforms, this 3 m difference in length is perhaps not yet of any consequence. If a worker 20, however, has to go back over, for instance, 15 conveyor trolleys 12, this corresponds to a 45 m shortening of the distance to be covered, which has a perceptible impact on the worker 20.

Figure 4:
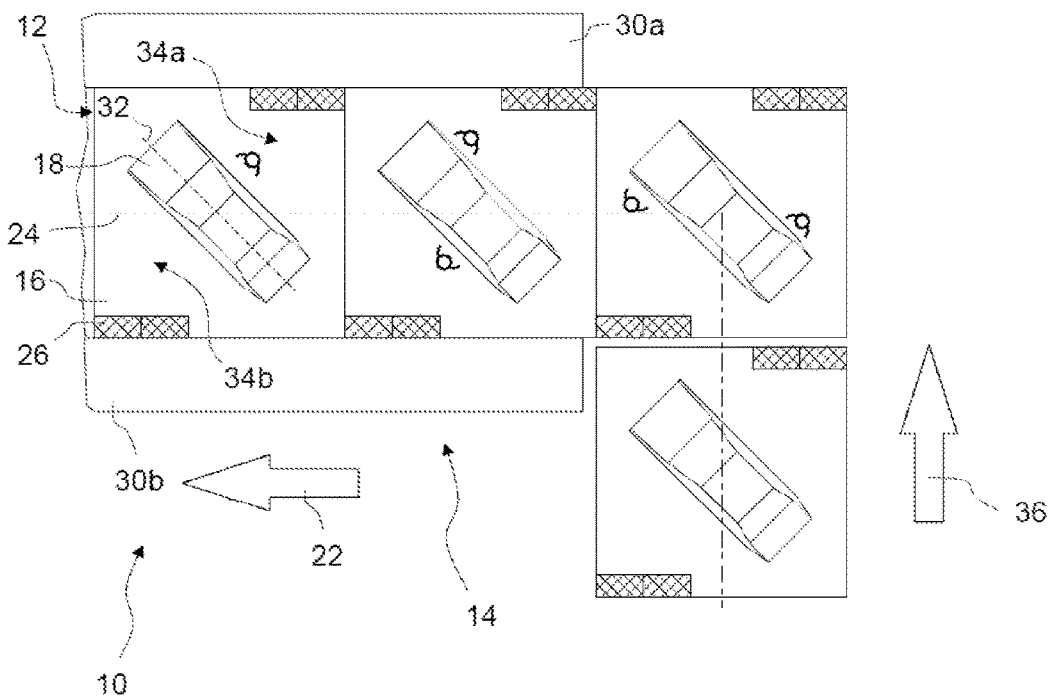
FIG. 4 shows an initial region of a rectilinear conveying section, in which the conveyor trolleys, prior to entry into the convoy, are laterally offset.

FIG. 4 shows the start of the conveying section 14, in which the conveyor trolleys 12 are initially transported transversely to the direction of conveyance 22 along the transverse direction indicated with the arrow 36, before they enter into the production section 14 and begin their movement along the direction of conveyance 22. For this purpose, the conveyor trolleys 12 possess omnidirectional running gears, so that they can change the direction of conveyance by 90° without the negotiation of bends. As can be seen in FIG. 4, the orientation of the longitudinal axes 32 of the motor vehicles 18, including during conveyance along the transverse direction 36, therefore remains parallel to the longitudinal axes 32 of those motor vehicles 18 which are already in the conveying section 14.

In a representation based on FIGS. 3 and 4, FIGS. 5 and 6 show a variant of the conveying system which is shown there, in which the material supply devices 26 are arranged differently on the assembly platforms 16. Here too, the material supply devices 26 are located in the corners of the triangular work areas 34a, 34b. The distances which must be covered by the workers 20 between the material supply devices 26 and the motor vehicles 18 to be assembled are in this variant somewhat shorter than in the illustrative embodiments shown in FIGS. 3 and 4. The arrangement of the material supply device 26 obliquely or perpendicular to the direction of conveyance 22 somewhat restricts, however, the crossing of the workers 20 onto adjacent assembly platforms 16.

Figure 5:
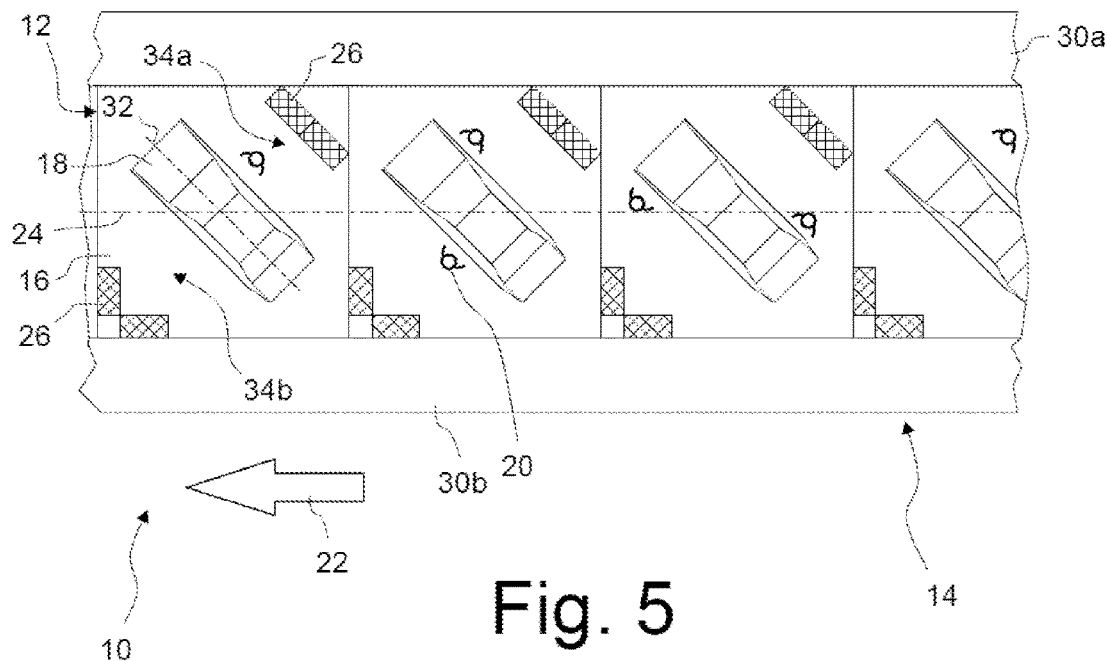
FIGS. 5 and 6 show a variant of the conveying system shown in FIGS. 3 and 4, in which the material supply devices are arranged differently on the assembly platforms.
Figure 6:
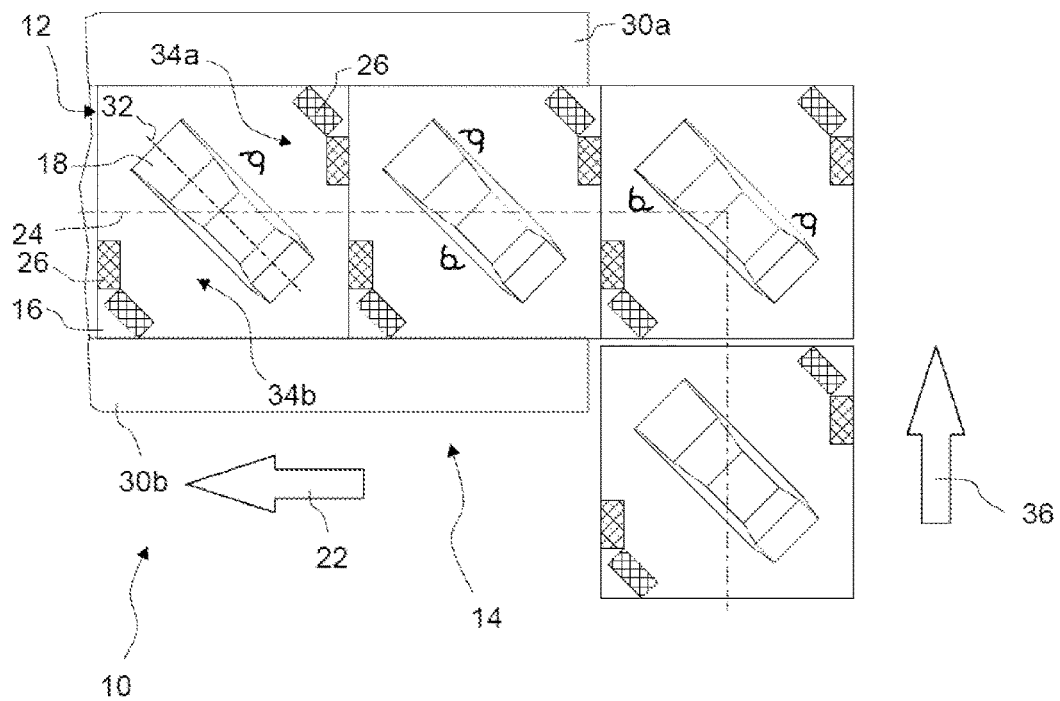
Figure 7:
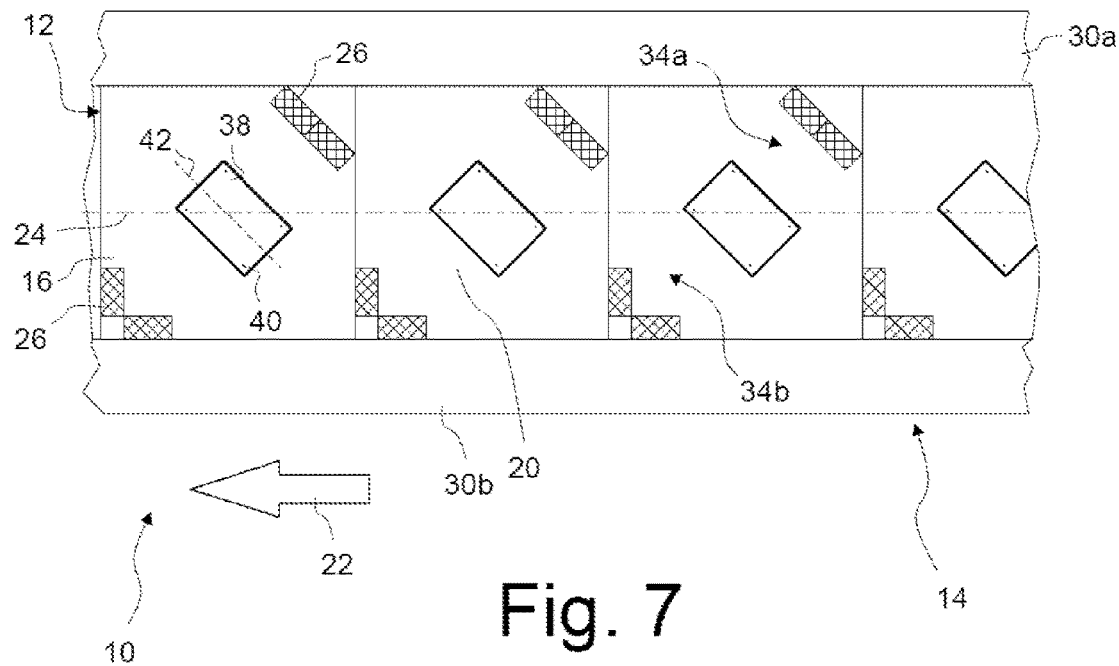
FIGS. 7 and 8 show the conveying systems shown in FIGS. 5 and 6, yet without the motor vehicles to be assembled.
Figure 8:
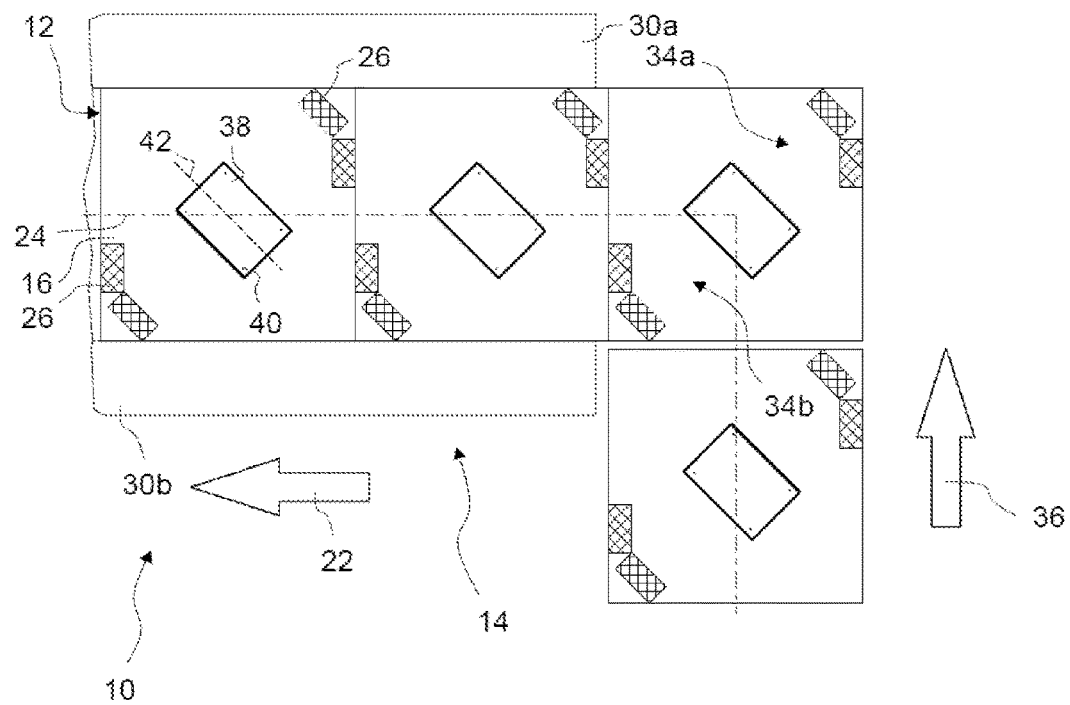

FIGS. 7 and 8 show the conveying systems 10 shown in FIGS. 5 and 6 in a top view, without the motor vehicles 18 which are to be assembled. Workpiece receptacles 38 which are designed to carry the motor vehicles 18 can hence be seen. The workpiece receptacles 38 can be configured in the style of a lifting table and hence be adjustable in height, so that the workers can work on the motor vehicles 18 at different heights. In the represented illustrative embodiment, the workpiece receptacles 38 respectively possess 4 conical recesses 40, in which complementarily shaped projections which are configured on the motor vehicles 18, or on an additional carrier for the motor vehicles 18, can engage. The workpiece receptacle 38 likewise have in total the shape of a rectangle, and a longitudinal axis 42 which runs at an angle of 45° to the direction of conveyance 22 and is aligned with the plane diagonal of the respective assembly platforms.

If the wheels are already fitted on the motor vehicles 18, the motor vehicles can also be placed directly onto the assembly platforms 16. An additional workpiece receptacle 38 is then not necessary.

The conveyor trolleys 12 with the motor vehicles 18 arranged obliquely thereon can advantageously also be used in conveying systems in which the conveyor trolleys do not form a convey in which the assembly platforms of adjacent conveyor trolleys adjoin one another in an at least substantially gap-free manner.

Figure 9:
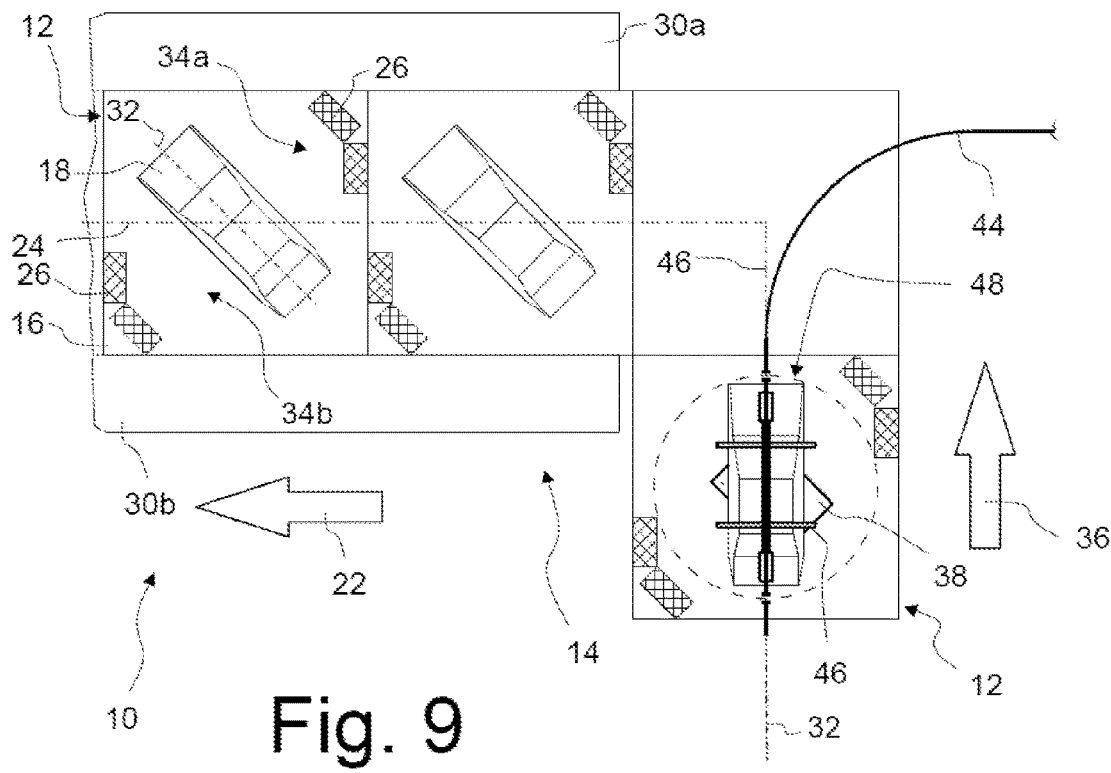
FIGS. 9 and 10 show an initial region of a rectilinear conveying section at two points in time, between which a workpiece has been rotated with the aid of a rotating device before being deposited on the workpiece receptacle of a conveyor trolley by an overhead conveyor.
Figure 10:
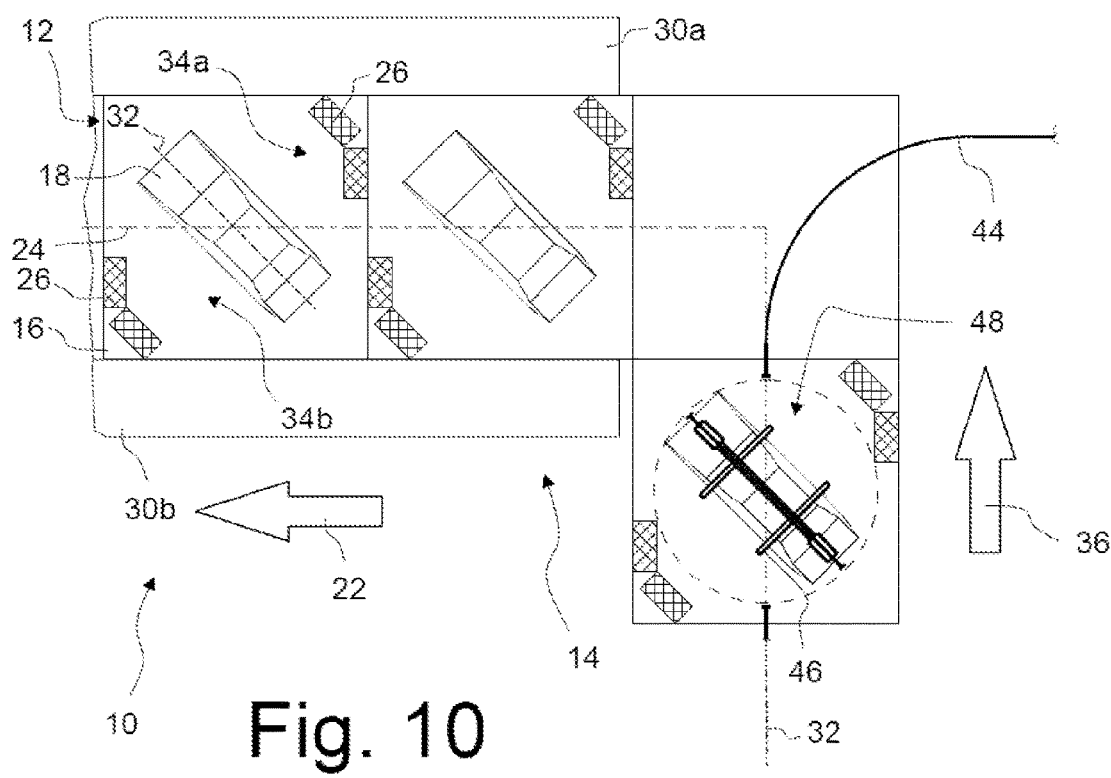

FIGS. 9 and 10 show in a schematic top view an initial region of a rectilinear conveying section 14 at two different points in time. With 44 is indicated the rail of an electric overhead conveyor which crosses the region in which the conveyor trolleys 12 move along the transverse direction 36. In this region, the direction of conveyance of the conveyor trolleys 12 thus runs parallel to the direction of conveyance of the electric overhead conveyor. As can be seen in FIG. 9, the motor vehicles 18 are fastened in such a way to overhead trolleys 46 of the electric overhead conveyor that the longitudinal direction 32 of the motor vehicles 18 is aligned with the rail 44 and thus runs parallel to the direction of conveyance of the electric overhead conveyor.

In FIG. 9 is represented the orientation of the motor vehicle 18 at a point in time prior to the depositing of the motor vehicle 18 on the assembly platform 16 of the ready-standing conveyor trolley 12. If this orientation of the motor vehicle 18 were maintained, then its longitudinal axis 32, after the entry into the rectilinear production section 14, would be oriented perpendicular to the direction of conveyance 22, which is undesirable.

The electric overhead conveyor therefore comprises in the transfer region a rotating device 48, with which a section of the rail 44 can be rotated, jointly with the overhead trolley 46 suspended therefrom, about a vertical axis. The angle of rotation is fixed such that the motor vehicle 18, following conclusion of the rotation, can be deposited precisely in the desired angular position on the workpiece receptacle 38. Thus, in this illustrative embodiment, the conveyor trolleys 12 do not themselves have to possess rotation units with which the workpiece receptacle 38 can be rotated.

A like rotating device can also be provided in a transfer region at the end of the conveying section 14 if the motor vehicles 18 are there due to be removed again from the conveyor trolleys 12 and transported onward with another conveying device.

Figure 11:
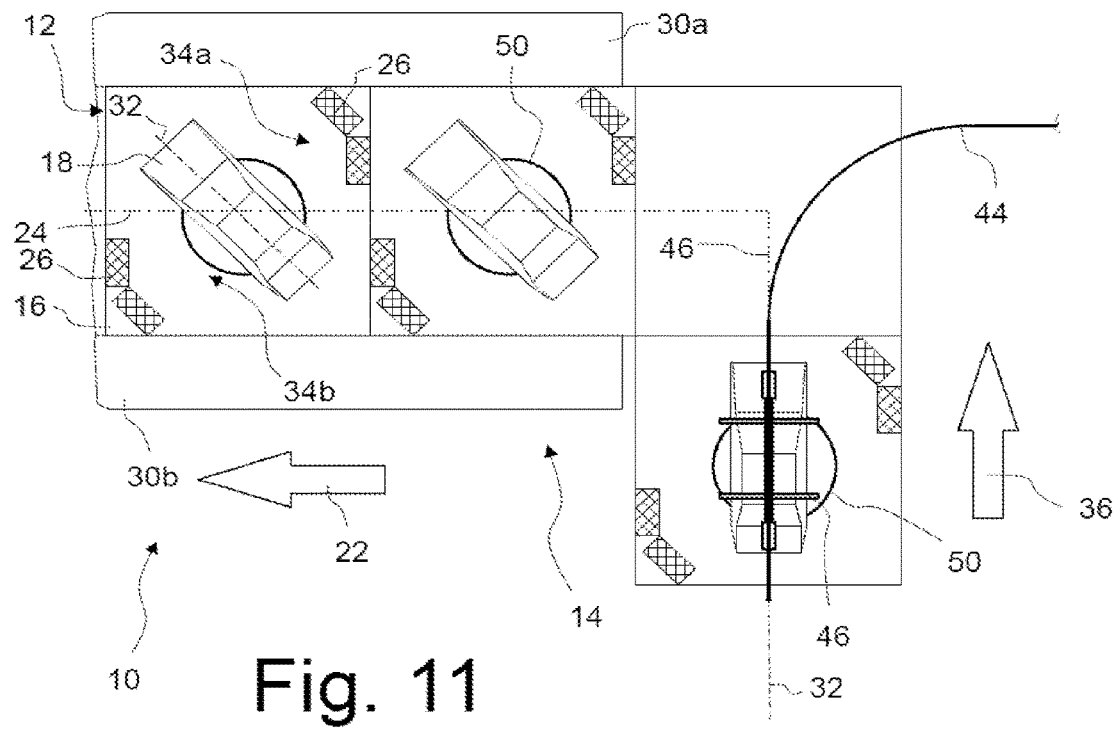
FIGS. 11 and 12 show an initial region of a rectilinear conveying section at two points in time, between which a workpiece has been rotated with the aid of a rotatable workpiece receptacle after having been deposited on the workpiece receptacle of a conveyor trolley by an overhead conveyor.
Figure 12:
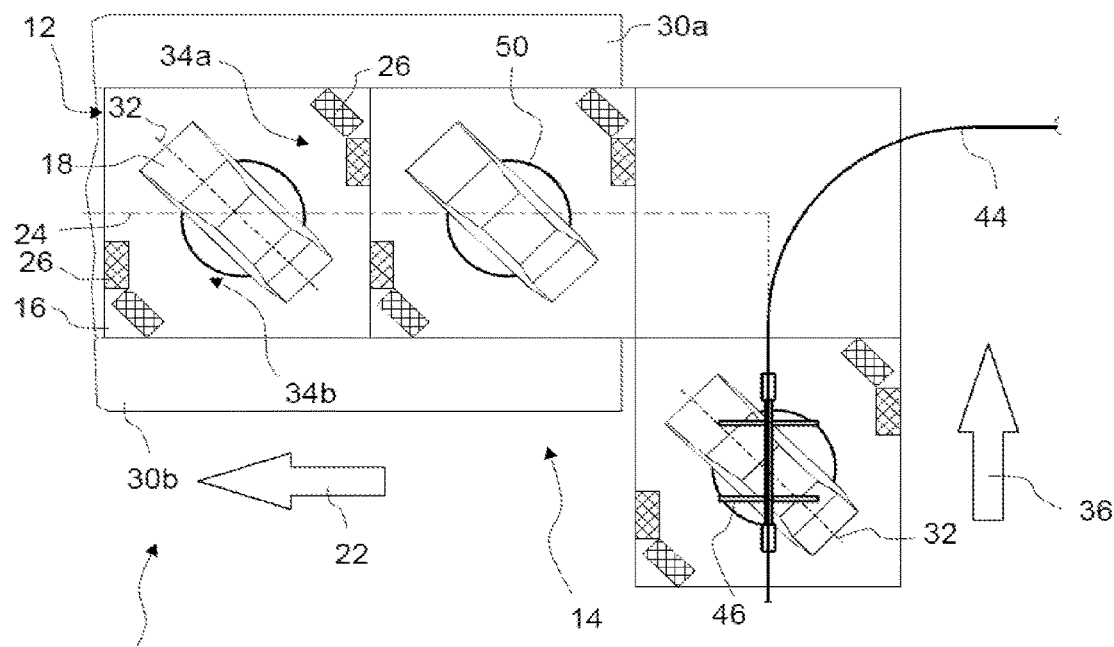

FIGS. 11 and 12 show in a schematic top view an initial region of a rectilinear conveying section 14 at two different points in time, according to another illustrative embodiment. No central rotating device is provided there. Instead, the conveyor trolleys 12 possess workpiece receptacles 38, which are respectively rotatable about a vertical axis by motorized or manual means. The end positions of the workpiece receptacles 38 should be lockable in order to prevent unintended rotation.

In the represented illustrative embodiment, the workpiece receptacles 38 are borne, for the purpose of rotatability, respectively by a turntable 50, which is flush-mounted in the assembly platform 16. Due to the rotatability of the workpiece receptacles 38, a motor vehicle 18 fastened thereon can at any time be rotated to the point where it reaches the desired angular position on the respective assembly platform 16, as can be seen in FIG. 12. In the transfer of the motor vehicle 18 from the overhead trolley 46 to the conveyor trolley 12, the motor vehicle 18 is therefore lowered from the overhead trolley 46 in the orientation shown in FIG. 11 and fastened on the workpiece receptacle 38. The workpiece receptacle 38 has been previously transferred into a rotational position in which the longitudinal axis of the workpiece receptacle is oriented parallel to the direction of conveyance 36 of the electric overhead conveyor. After this, the workpiece receptacle is anti-clockwise through 45°, whereby the motor vehicle 18 is transferred into the desired angular position.

In a further variant (not represented), not the conveyor trolleys 12, but rather the overhead trolleys 46, are equipped with a rotating device, with which the workpieces 18 can be rotated about a vertical axis.

What is claimed is:

1. A method for the simultaneous transport of elongated workpieces and workers in a production line which has a rectilinear production section, the method comprising:
   moving a plurality of conveyor trolleys in a rectilinear production section of a production line jointly along a direction of conveyance, each conveyor trolley having an assembly platform that extends over a whole length of the conveyor trolley and is accessible for workers, wherein the plurality of conveyor trolleys form a convoy when moving in which the assembly platforms of adjacent conveyor trolleys adjoin one another in an at least substantially gap-free manner,
   wherein
   workpieces are arranged in such a way on the assembly platforms of the conveyor trolleys that a longitudinal direction of the workpieces is arranged at an angle between 25° and 65° to the direction of conveyance.

2. The method according to claim 1, wherein the workpieces are arranged on the assembly platforms of the plurality of conveyor trolleys so that a longitudinal direction of the workpieces is arranged at an angle between 40° and 50° to the direction of conveyance.

3. The method according to claim 1, wherein the workpieces are motor vehicles which are to be assembled.

4. The method according to claim 1, wherein the longitudinal axes of the workpieces are arranged parallel to one another in the rectilinear conveying section.

5. A conveying system for the simultaneous transport of elongated workpieces and workers in a production line which has a rectilinear production section, the conveying system comprising:
   a plurality of conveyor trolleys, each conveyor trolley having a workpiece receptacle and an assembly platform that extends over a whole length of the conveyor trolley and is accessible for workers, wherein the conveyor trolleys move in a rectilinear production section of a production line jointly along a direction of conveyance and form a convoy in which the assembly platforms of adjacent conveyor trolleys adjoin one another in an at least substantially gap-free manner,
   wherein
   the workpiece receptacle is configured such that a longitudinal direction of a workpiece to be fastened thereon is arranged at an angle between 25° and 65° to the direction of conveyance.

6. The conveying system according to claim 5, wherein the workpiece receptacle is configured such that the longitudinal direction of the workpiece to be fastened thereon is arranged at an angle between 40° and 50° to the direction of conveyance.

7. The conveying system according to claim 5, wherein the workpiece receptacle has a longitudinal direction which is arranged at an angle between 25° and 65° to the direction of conveyance.

8. The conveying system according to claim 5, wherein each assembly platform has the shape of a rectangle having an aspect ratio V with V<1.2.

9. The conveying system according to claim 5, wherein each assembly platform is divided by the longitudinal axis of the workpiece into two work areas, which are at least substantially triangular, and each of the two work areas has at least one material supply device for the storage of individual parts to be fitted, and for the removal thereof by the worker.

10. The conveying system according to claim 5, wherein in the rectilinear conveying section, the longitudinal axis of the workpieces on the assembly platforms are arranged parallel to one another.

11. The conveying system according to claim 5, wherein each workpiece receptacle is rotatable about a vertical axis.

12. The conveying system according to claim 5, wherein the conveying system has:
   a) a conveyor line, in which the workpieces are conveyed along a further direction of conveyance such that the longitudinal directions of the workpieces are oriented parallel to the further direction of conveyance, and
   b) a rotating device, which is designed to rotate the workpiece about a vertical axis before it is fastened on the workpiece receptacle.

* * * * *